US010653154B2

(12) United States Patent
Celeslie

(10) Patent No.: US 10,653,154 B2
(45) Date of Patent: May 19, 2020

(54) HORIZONTAL CHAR SLICER, SYSTEM AND METHOD

(71) Applicant: Kronos Foods Corp., Glendale Heights, IL (US)

(72) Inventor: Christopher Celeslie, Grayslake, IL (US)

(73) Assignee: Kronos Foods Corp., Glendale Heights, IL (US)

( * ) Notice: Subject to any disclaimer, the term of this patent is extended or adjusted under 35 U.S.C. 154(b) by 0 days.

(21) Appl. No.: 16/153,943

(22) Filed: Oct. 8, 2018

(65) Prior Publication Data

US 2020/0107555 A1   Apr. 9, 2020

(51) Int. Cl.
| | | |
|---|---|---|
| *A22C 11/00* | (2006.01) | |
| *A22C 17/00* | (2006.01) | |
| *B26D 7/06* | (2006.01) | |
| *B26D 7/10* | (2006.01) | |
| *B26D 1/46* | (2006.01) | |

(52) U.S. Cl.
CPC ........ *A22C 17/0033* (2013.01); *A22C 17/002* (2013.01); *B26D 7/0625* (2013.01); *B26D 7/10* (2013.01); *B26D 1/46* (2013.01); *B26D 2210/02* (2013.01)

(58) Field of Classification Search
CPC .............. A22C 17/0033; A22C 17/002; A22C 17/0625; A22C 17/10; B26D 1/46; B26D 2210/02
See application file for complete search history.

(56) References Cited

U.S. PATENT DOCUMENTS

| | | | |
|---|---|---|---|
| 4,867,994 A | 9/1989 | Perrine | |
| 5,357,853 A | 10/1994 | Nelson et al. | |
| 5,481,466 A * | 1/1996 | Carey | A22C 17/002 700/167 |
| 5,482,166 A * | 1/1996 | Brown | A22C 17/002 209/580 |
| 6,827,005 B2 | 12/2004 | Babacan | |
| 6,997,089 B2 * | 2/2006 | Lindee | A22C 17/0033 83/29 |
| 8,424,430 B2 * | 4/2013 | Malenke | B65B 25/06 414/789.9 |

(Continued)

*Primary Examiner* — Omar Flores Sanchez
(74) *Attorney, Agent, or Firm* — Greer, Burns & Crain, Ltd.

(57) ABSTRACT

A horizontal char slicer for cutting a food product includes a frame housing having a heating housing and a cutting device located at a discharge end of the heating housing. The heating housing includes a heating element, and the cutting device has a generally horizontal cutting plane. A generally horizontal conveyor belt extends at least the length of the frame housing, between a heating inlet for delivering the food product through the heating housing to the cutting device. The horizontal conveyor belt also extends from the cutting device to an outlet of the frame housing. The horizontal conveyor belt transports the food product away from the cutting device. A finished-product conveyor also extends from the cutting device for transporting a finished-product away from the cutting device. The finished-product conveyor and the horizontal conveyor belt are configured to work in parallel downstream of the cutting device.

5 Claims, 4 Drawing Sheets

(56) References Cited

U.S. PATENT DOCUMENTS

| | | | | |
|---|---|---|---|---|
| 8,517,164 B2* | 8/2013 | Zampollo | ............. | B65H 33/16 198/418.6 |
| 8,616,103 B2* | 12/2013 | Lindee | ..................... | B26D 7/18 83/469 |
| 8,683,903 B2* | 4/2014 | Strong | ................ | B23D 47/045 198/626.4 |
| 8,850,938 B2* | 10/2014 | Lindee | ..................... | B26D 7/18 83/130 |
| 8,910,457 B2* | 12/2014 | Lagares Corominas | .................... | B26D 7/32 53/513 |
| 8,931,240 B2* | 1/2015 | Lindee | .................. | B25J 9/0093 53/251 |
| 8,978,529 B2* | 3/2015 | Pasek | ...................... | B26D 7/18 83/155 |
| 9,713,335 B2* | 7/2017 | Roberds | ................ | A22C 11/00 |
| 2003/0233918 A1* | 12/2003 | Lindee | ............... | A22C 17/0033 83/13 |
| 2006/0161380 A1* | 7/2006 | Bottemiller | .............. | A22C 7/00 702/151 |
| 2008/0223228 A1 | 9/2008 | Biggs et al. | | |
| 2009/0137195 A1* | 5/2009 | Bottemiller | .......... | A22C 17/008 452/150 |
| 2015/0306778 A1 | 10/2015 | Al Afandi et al. | | |
| 2015/0336285 A1* | 11/2015 | Grasselli | ............ | A22C 17/0033 83/368 |
| 2016/0213011 A1 | 7/2016 | Howard | | |
| 2017/0027183 A1* | 2/2017 | Roberds | ................ | A22C 11/00 |
| 2017/0312931 A1* | 11/2017 | Volkl | ................... | A22C 25/08 |
| 2018/0345519 A1* | 12/2018 | Volkl | ................... | A22C 17/002 |
| 2018/0370055 A1* | 12/2018 | Volkl | ................... | B26D 7/2635 |
| 2019/0030740 A1* | 1/2019 | Grasselli | ............ | B26D 7/0625 |
| 2019/0084174 A1* | 3/2019 | Wilson | ................ | B26D 7/0625 |
| 2019/0232516 A1* | 8/2019 | Volkl | ................... | A22C 17/002 |
| 2019/0317467 A1* | 10/2019 | Blaine | ..................... | B26D 5/00 |

* cited by examiner

US 10,653,154 B2

HORIZONTAL CHAR SLICER, SYSTEM AND METHOD

FIELD OF THE INVENTION

The present invention relates to machines, systems and methods for both charring and cutting food products, and in particular protein loafs, such as lamb, beef, chicken, pork, turkey or other meat or plant-based protein. In another aspect, the present invention relates to machines, systems and methods for providing a charred and sliced finished food product from an unfinished food product that is input into the machine.

BACKGROUND OF THE INVENTION

With the growth in demand for ready-to-eat meals, there has been a growth in the demand for components of ready-to-eat meals, such as pre-cooked protein products. In particular, there has been a growth in the demand for pre-cooked and pre-cut proteins, such as gyro slices, chicken or fish tenders, fajita strips, as well as vegetarian protein options. These types of prepared protein products are typically made from protein loafs that are formed of compressed ground or whole muscle proteins, or may include plant-based proteins, that are subsequently cooked and cut in separate steps.

Currently, a typical process for preparing and cutting these types of pre-cooked protein products includes the steps of: (1) injecting a protein loaf with flavorings and/or preservatives; (2) cooking the protein loaf on a belt grill or a spiral cooker; (3) transferring the cooked protein loaf to a pre-chiller machine to reduce the temperature of the protein loaf; (4) transferring the protein loaf from the pre-chiller to a conveyor feeding a cutting machine for slicing the cooked protein loaf; (5) cutting the protein loaf at the cutting machine; (6) transferring the sliced protein product from the cutting machine into a freezer; and (7) packaging the frozen sliced protein product with a packaging machine.

Typical apparatuses used in the process of cooking and slicing include a cooker, a pre-chiller and a cutting machine, all of which are separate apparatuses. It is common for the protein loaf to be pre-chilled prior to cutting to prevent the squeezing of moisture from the protein loaf that can occur when it is still hot. When the protein loaf is cold, less moisture is lost during the cutting step. This is one reason why hot slicing has been avoided in the industry.

Further, in the typical apparatuses, systems and methods as described above, if char (or other browning) is applied to the protein loaf, charring only occurs at a top surface of the protein loaf, so only a portion of the sliced protein product receives the flavorful char while the remainder of the protein product underneath the top surface does not receive the char.

SUMMARY OF THE INVENTION

A horizontal char slicer for cutting a food product includes a frame housing having a heating housing and a cutting device located at a discharge end of the heating housing. The heating housing includes a heating element, and the cutting device has a generally horizontal cutting plane. A generally horizontal conveyor belt extends at least the length of the frame housing, between a heating inlet for delivering the food product through the heating housing to the cutting device. The horizontal conveyor belt also extends from the cutting device to an outlet of the frame housing. The horizontal conveyor belt transports the food product away from the cutting device. A finished-product conveyor also extends from the cutting device for transporting a finished-product away from the cutting device. The finished-product conveyor and the horizontal conveyor belt are configured to work in parallel downstream of the cutting device.

A system for producing a pre-cooked food product includes at least two horizontal char slicers that are configured to operate in series with a horizontal conveyor belt extending through the at least two horizontal char slicers. The at least two horizontal char slicers include a heating housing and a cutting device located at a discharge end of the heating housing. The cutting device has a generally horizontal cutting plane. The first of the at least two horizontal char slicers has a cutting plane that is a first height above the horizontal conveyor belt, and the second of the at least two horizontal char slicers has a cutting plane that is a second height above the horizontal conveyor belt. The second height is lower than the first height with respect to the horizontal conveyor belt.

A method of producing a pre-cooked food product includes the steps of: inputting a food product into a first horizontal char slicer, where a horizontal conveyor belt receives the food product and transports the food product into and through a heating housing having a heating element, the heating housing having a discharge end; delivering the food product through the heating housing in a generally horizontal path; cutting the food product directly after being discharged from the discharge end of the heating housing; outputting a finished product that is cut and removed from the food product; outputting a remainder of the food product that is an unfinished product; and inputting the unfinished product into a second horizontal char slicer, where the unfinished food product is conveyed through a heating housing having a heating element.

DETAILED DESCRIPTION OF PREFERRED EMBODIMENTS

Figure 1:
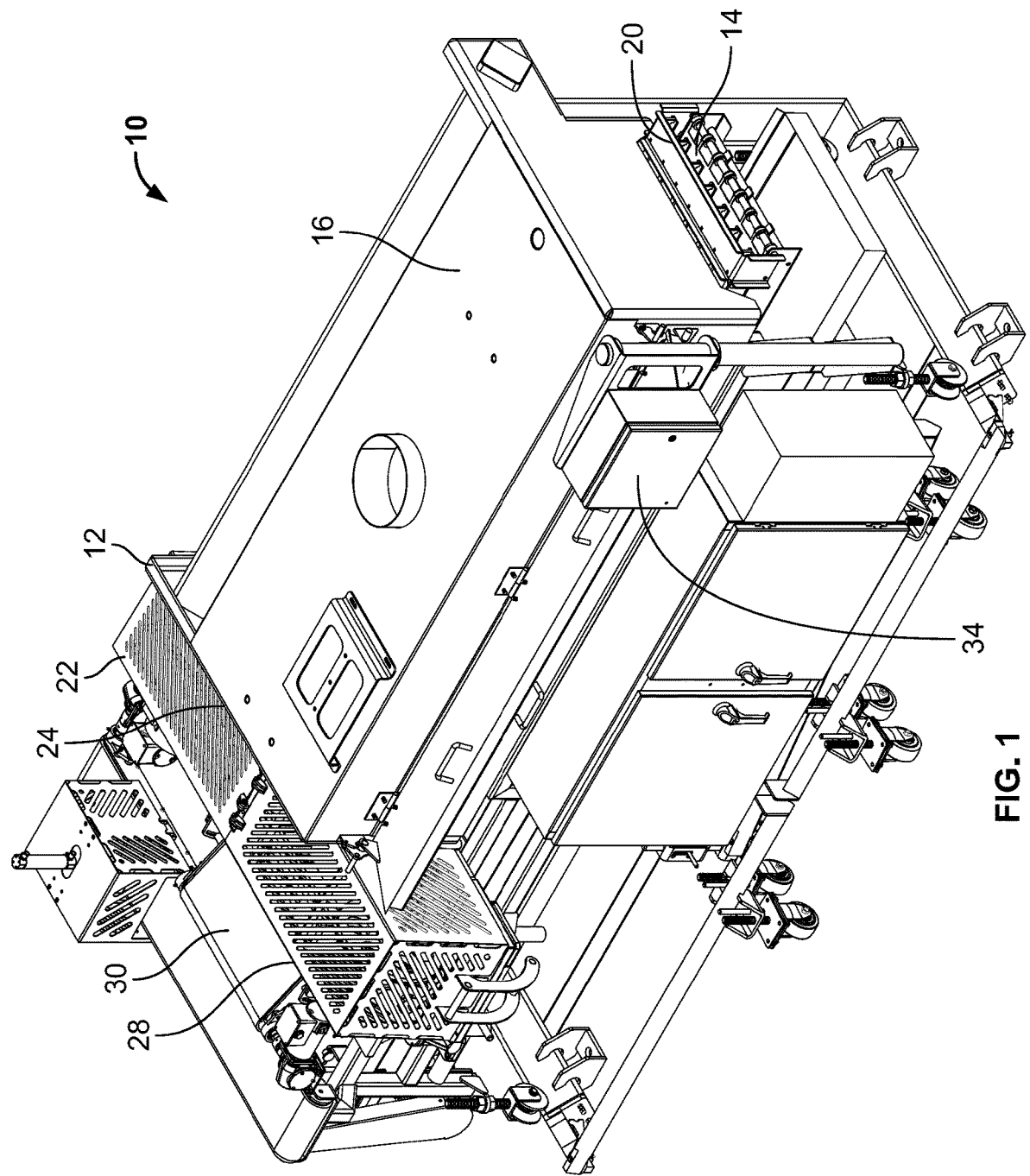
FIG. 1 is a front perspective view of a horizontal char slicer.
Figure 2:
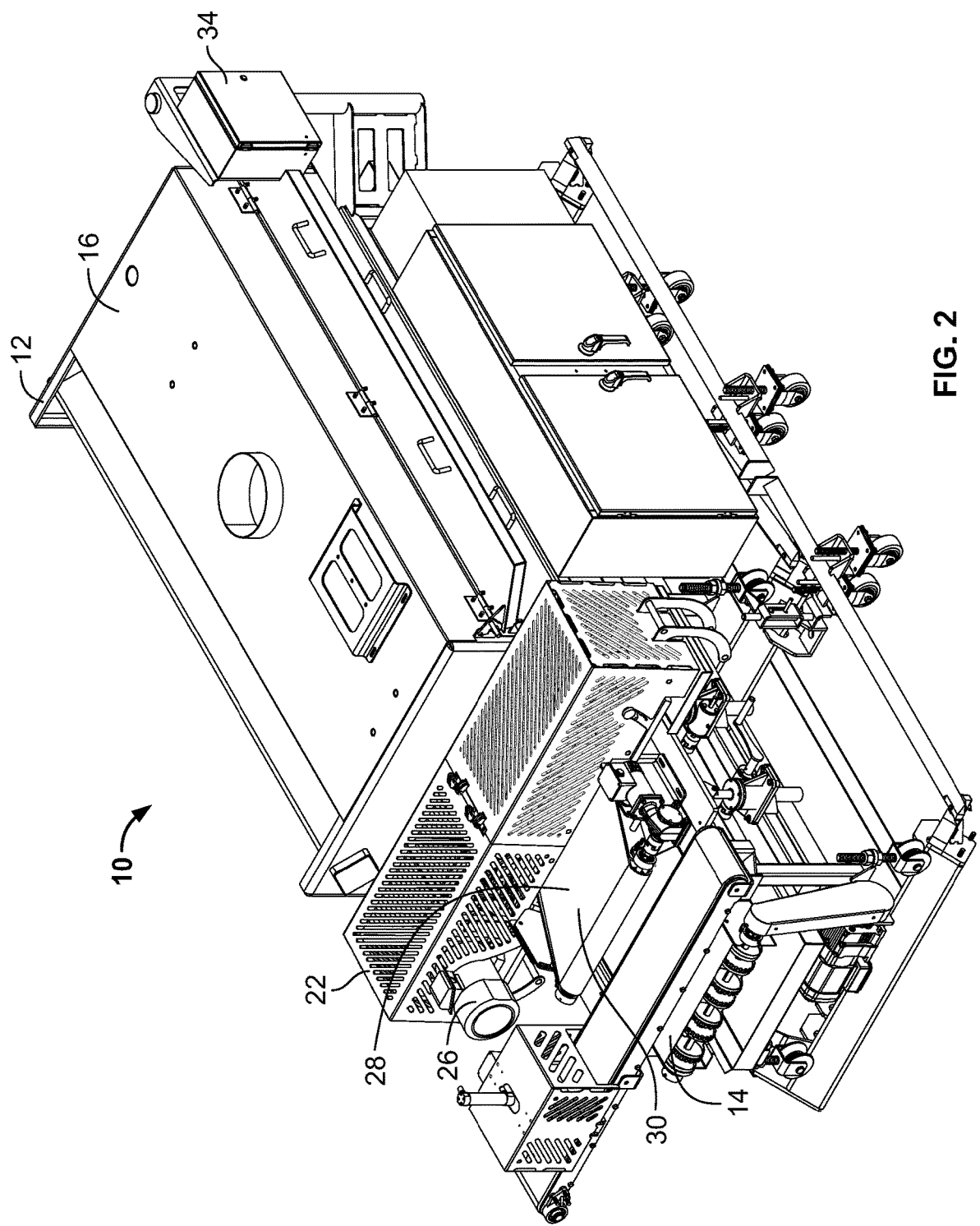
FIG. 2 is a rear perspective view of a horizontal char slicer.

The horizontal char slicer 10 of the present invention is shown in FIGS. 1-2 as including a frame housing 12 through which is mounted a generally horizontal conveyor belt 14. The conveyor belt 14 conveys a food product 15, herein referred to as "protein loaf" through the frame housing 12 of the horizontal char slicer 10 in a generally horizontal path. While the term "protein loaf" will be used herein, it should be appreciated that many types of food products can be used with the present horizontal char slicer, system and method.

At the front or input side of the char slicer 10 is a heating housing 16 which includes a heating element 18 that is preferably an infrared burner. The infrared burner 18 is mounted within the heating housing 16 in a burner plane BP that is generally parallel to the path of the horizontal conveyor belt 14. In one embodiment, the infrared burner 18 is mounted generally parallel to and above the horizontal conveyor belt 14, and has a length of about 6-feet. However, other lengths, numbers and locations of the infrared burner 18 within the heating housing 16 are contemplated.

As the horizontal conveyor belt 14 enters the heating housing 16 at a heating inlet 20, the protein loaf 15 is conveyed through the heating housing and exposed to the infrared burner 18, which gives it a char or other level of browning depending on the temperature and time of exposure of the protein loaf to the infrared burner. The char will occur only at an exterior surface 17 of the protein loaf 15 that is exposed to the infrared burner. In the preferred embodiment with the infrared burner 18 mounted generally parallel and above the horizontal conveyor belt 14, the exterior surface 17 that receives the char will be a top surface of the protein loaf that faces the infrared burner 18. It has been found that through use of the horizontal char slicing machine 10 of the preferred embodiment, the charring or browning that occurs on the protein loaf 15 is located at about ⅛-inch to ¼-inch thickness "t" at the top surface 17 of the protein loaf.

Rearwardly of the heating housing 16 (in the direction of travel of the horizontal conveyor belt 14), the horizontal char slicer 10 includes a horizontal cutting device 22. The horizontal cutting device 22 is installed on the discharge end 24 of the heating housing 16. In one embodiment, the horizontal cutting device 22 is at all times fixed to the heating housing 16 during operation, but it is also contemplated that the horizontal cutting device 22 may be removable from the remainder of the frame housing 12 for purposes of cleaning the horizontal char slicer 10.

The horizontal cutting device 22 preferably includes a band slicer 26 mounted within the cutting device that receives the protein loaf 15 directly from the heating housing 16. The band slicer 26 is fixed to the discharge end 24 of the heating housing 16 and is preferably at least the width of the conveyor belt 14 to capture all protein loafs 15 that are placed on the conveyor belt. Further, the horizontal band slicer 26 is preferably a rotating blade, such as a bandsaw, that operates conventionally as is known in the art, such as with a drive wheel, a second blade support wheel, a drive motor connected to the first drive wheel and a tension adjustment mechanism (not shown). Alternative cutting devices may also be used.

The band slicer 26 is positioned such that its cutting blade defines a cutting plane CP that is oriented to cut the charred exterior surface portion 17 of the protein loaf 15 that is being transported through the horizontal char slicer 10 on the conveyor belt 14. In the preferred embodiment with the infrared burner 18 mounted generally parallel above the horizontal conveyor belt 14 in a burner plane BP, and with the top exterior surface 17 of the protein loaf receiving the char, the band slicer 26 is oriented generally parallel to the conveyor belt 14 to slice the top exterior surface 17 of the protein loaf at the cutting plane CP. In other words, the cutting plane CP, the burner plane BP and the conveyor belt 14 are all generally parallel and are all generally horizontal. With this configuration, the band slicer 26 slices the top exterior surface 17 off of the remainder of the protein loaf 15.

Further in the preferred embodiment where the charring or browning occurs at a depth of about ⅛-inch to ¼-inch thickness of the protein loaf 15, the band slicer 26 may be adjustable to slice off the ⅛-inch to ¼-inch at the top surface 17 of the protein loaf 15. It is contemplated that the band slicer 26 may be fully adjustable to slice the protein loaf 15 at any thickness, however the ⅛-inch to ¼-inch thickness is the range of most preferred thicknesses. While the thickness of the slice cut by the band slicer 26 may be adjustable, an advantage of the horizontal char slicer 10 is that the band slicer is capable of only slicing off the charred exterior surface 17, leaving the remainder of the uncharred loaf intact. In another embodiment, additional band slicers 26 may slice off additional portions of the protein loaf 15 that are uncharred, or in yet another embodiment with a different configuration or orientation of heating elements 18, additional band slicers may be used to remove more than one charred exterior surface 17 from the protein loaf.

The charred and sliced portion of the protein loaf 15 that is removed at the horizontal cutting device 22 is the finished product 19. The finished product 19 is conveyed away from the outlet 28 of the cutting device 22 on a finished-product conveyor 30. The outlet 28 of the cutting device 22 is also the outlet of the frame housing 12. The finished-product conveyor 30 may extend from the outlet 28 in the same general direction as the horizontal conveyor belt 14, but it is a separate conveyor from the horizontal conveyor belt 14. In other words, the finished-product conveyor 30 and the horizontal conveyor belt 14 diverge to run in parallel, as opposed to in series. More than one finished-product conveyor 30 may be used to transport the finished product 19 to a finished product collector 32.

Figure 3:
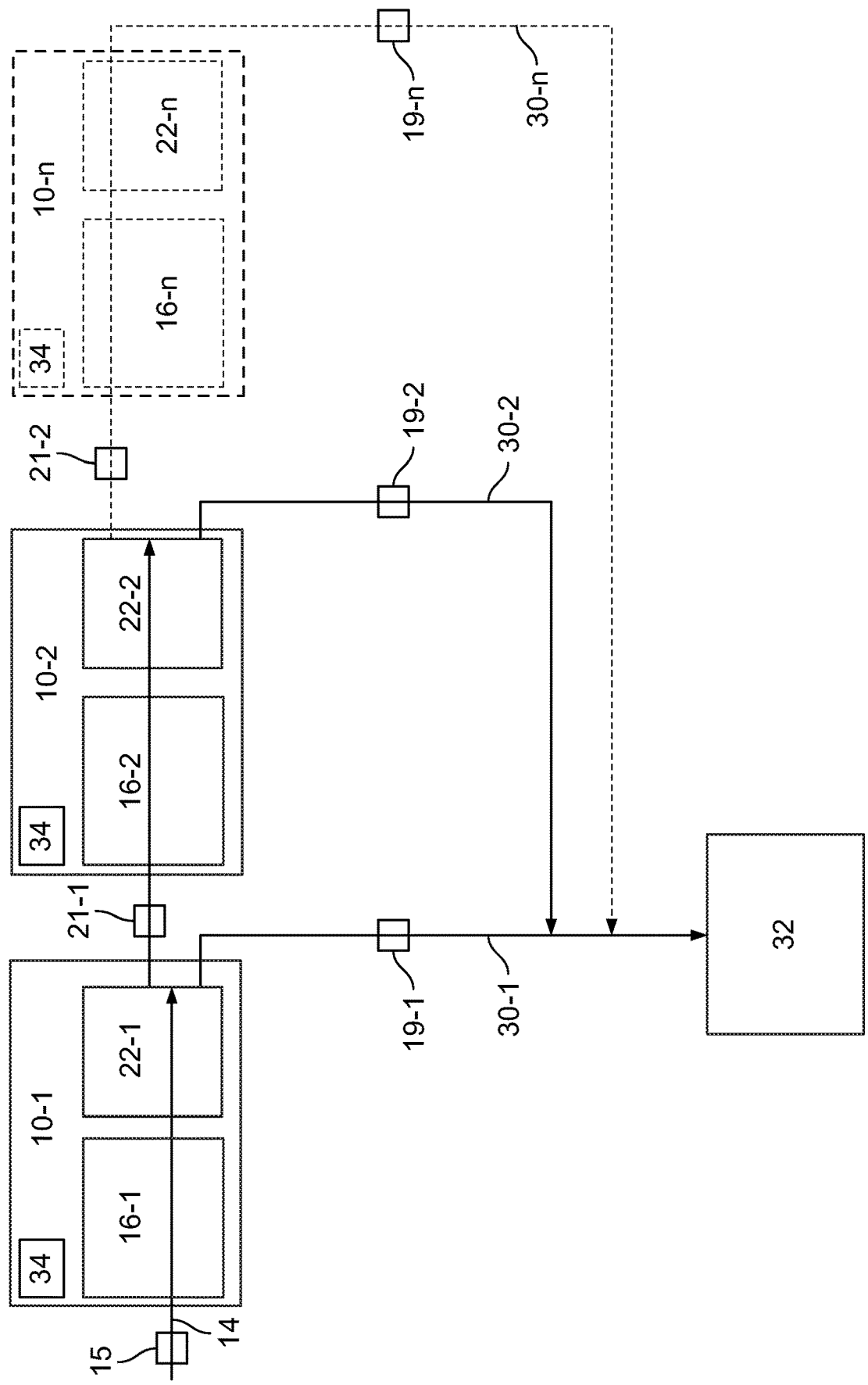
FIG. 3 is a block diagram of a horizontal char slicing system illustrating the method process of charring and slicing a protein loaf with multiple horizontal char slicers in series.
Figure 4:
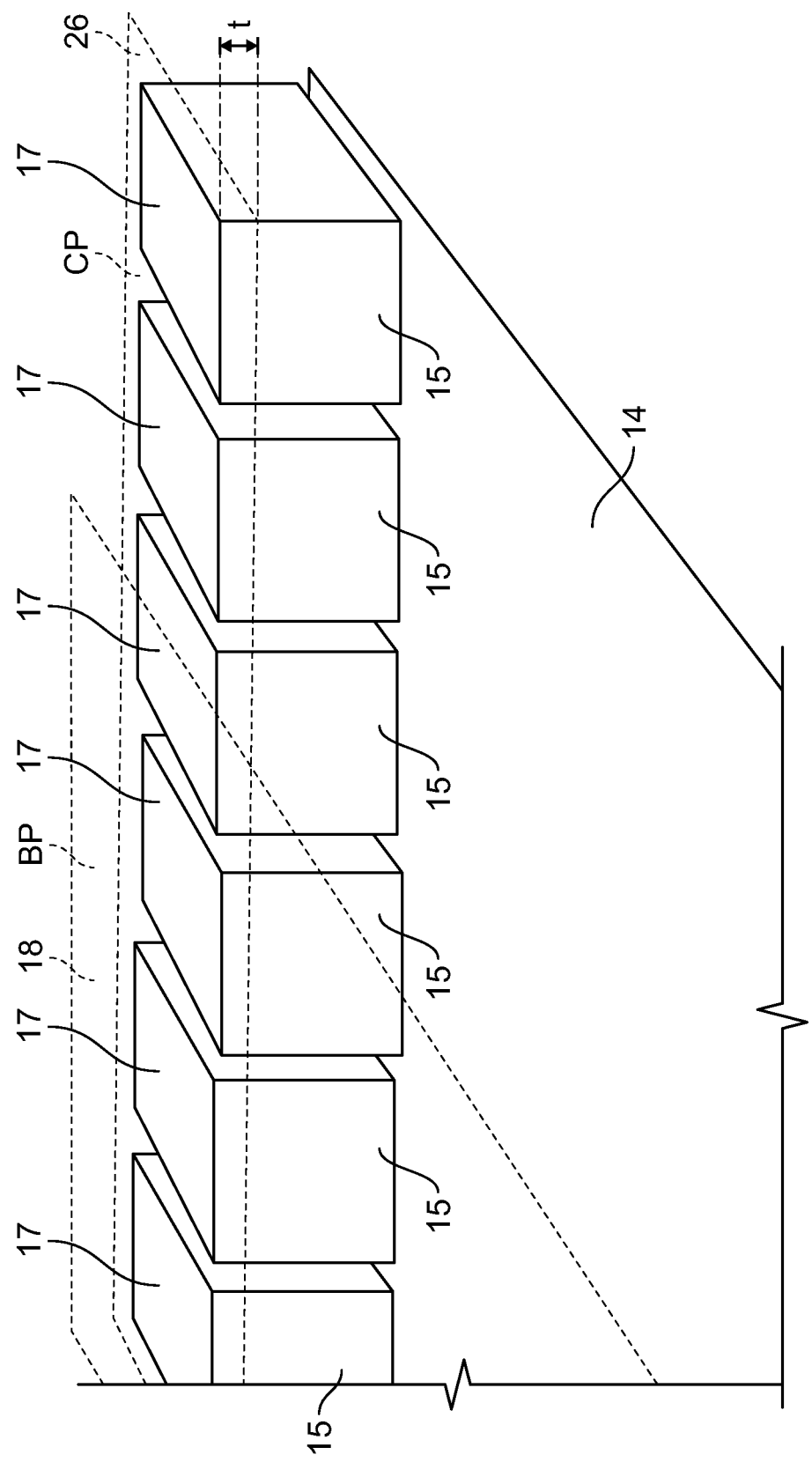
FIG. 4 is a schematic showing the horizontal plane of a conveyor belt, the horizontal plane of a heating element, and the horizontal plane of a cutting device, all located in the horizontal char slicer.

Referring to FIG. 3, after the protein loaf 15 is processed at a first horizontal char slicer 10-1 having a first heating housing 16-1 and a first cutting device 22-1 that slices a first finished product 19-1 and transports it away on a first finished-product conveyor 30-1, the remaining portion of the protein loaf 15 that is not removed at the horizontal cutting device is the unfinished loaf or product 21-1. The unfinished loaf 21-1 continues on the horizontal conveyor belt 14 through the outlet 28 of the cutting device 22 of the first horizontal char slicer 10-1 and is received by a subsequent horizontal char slicer 10-2 that is substantially the same as the first horizontal char slicer. In the subsequent horizontal char slicer 10-2, the now smaller protein loaf 15 (now unfinished loaf 21-1) is again charred and then sliced at heating housing 16-2 and cutting device 22-2 as described above, leaving a subsequent finished product 19-2 that is conveyed away on a second finished-product conveyor 30-2 and an unfinished loaf 21-2 that is received by a subsequent horizontal char slicer 10-n.

In the series of horizontal char slicers 10-1, . . . , 10-n, to continue to char and slice the protein loaf 21-2 at heating housing 16-n and cutting device 22-n where the protein loaf is decreasing in size with the passage through each machine, the height of the cutting plane CP above the horizontal conveyor 14 is reduced in each subsequent horizontal char slicer 10. In the preferred embodiment, it is contemplated that up to twelve horizontal char slicers 10 can be used in series to char and slice each piece of finished protein product 19, with each horizontal char slicer having a lowered cutting plane. At the last horizontal char slicer 10-n in the series, there only remains a finished product 19-n that is conveyed away at the finished product conveyor 30-n. It is contemplated that the last horizontal char slicer 10-n in the series may only char the protein loaf 15 without the need to further cut it. Additionally, the number n of horizontal char slicers 10-n is dependent on the thickness of the protein loaf 15 and the thickness of the sliced finished protein product 19 that is removed from the protein loaf.

The system and method for charring and horizontally slicing the protein loafs 15 includes multiple horizontal char slicer machines 10 that work in series to create slices, strips and pieces of flame-broiled food products. The system and method is capable of applying a char and slicing the entirety of the protein loaf, so that each finished product that is sliced from the protein loaf has a char, and the entirety of the protein loaf becomes a finished product.

The system within each horizontal char slicer 10 (or within each machine with exception to the final machine) has two steps or stages: Stage A includes the charring or browning of at least one surface 17 of the protein loaf 15 at the heating element 20; and Stage B includes the slicing stage where only the charred surface(s) 17 of the protein loaf 15 are sliced off or removed from the remainder of the unfinished protein loaf at a cutting device 22. Both Stage A and Stage B are performed in the same horizontal char slicer machine 10, but multiple horizontal char slicer machines 10 work in series to repeatedly perform the function of Stage A and Stage B, whittling down the size of the unfinished protein loaf 21 until the entire protein loaf 15 has been both charred and sliced to become a finished protein product 19.

As shown in FIGS. 1 and 2, the conveyor belt 14 extends through the entire char slicing machine 10, preferably having a length of approximately 11 feet and a width of approximately 24-inches, and is preferably constructed of a wire mesh, however other lengths and configurations are contemplated. The conveyor belt 14 has a generally horizontal and linear path through the frame housing 12. The horizontal conveyor belt 14 enters the heating housing 16 at the heating inlet 20 and exits the frame housing 12 at an outlet 28 of the cutting device 22. While the horizontal conveyor belt 14 may be a single belt through the char slicing machine, or even through the series of char slicing machines, it is contemplated that the multiple belts may comprise the horizontal conveyor belt 14 that operates as a single delivery system through the multiple slicing machines to deliver the protein loaf generally horizontally through the system. While in the horizontal char slicer 10, the protein loaf 15 is always generally horizontal and is not rotated.

In the preferred embodiment, six rows of 2-inch wide by 1 to 3-inch tall protein loafs 15 are fed on the horizontal conveyor 14. As the six rows of protein loaf 15 exit the heating housing 16, they will pass into the cutting device 22 where the horizontal slicer removes the top ⅛-inch to ¼-inch thick slice of charred protein from each of the six protein loafs 15.

The horizontal char slicer 10 of the present invention is operated in the following manner A protein loaf 15 is placed on the conveyor belt 14 and the conveyor belt is driven conventionally by a standard belt drive device (not shown) to transport the protein loaf through the heating housing 16 including the infrared burner 18. A controller 34 may include an on/off switch, temperature, speed and other controls. The controller 34 may also adjust the height of the horizontal conveyor belt 14, the height of the heating element 18, and/or the height of the cutting device 22.

After the protein loaf 15 is charred at the infrared burner 18, the conveyor belt 14 transports the protein loaf out the discharge end 24 of the heating housing 16 and into engagement with the horizontal band saw 26 of the cutting device 22, where the protein loaf is cut in the horizontal cutting plane. The finished product 19 is transported on a finished-product conveyor 30 and further transported to a finished product collector 32, where additional processing may take place. Meanwhile, the unfinished loaf 21 is automatically transferred to the horizontal conveyor belt 14 of the next horizontal char slicer 10. It is also contemplated that the unfinished loaf 21 can be manually transferred to the next horizontal char slicer. Additionally, as discussed above, the horizontal conveyer belt 14 can be a single belt extending through all of the horizontal char slicers 10, or may comprise multiple belts making up a single horizontal delivery path through the multiple horizontal char slicers.

An advantage of the present apparatus, system and method is that each slice of the finished product 19 has been char-flavored in a continuous and highly efficient manner.

It is to be understood that numerous modifications and substitutions may be made to the present invention which fall within the intended broad description of the invention.

What is claimed is:

1. A method of producing a pre-cooked food product comprising the steps of:
   inputting a food product into a first horizontal char slicer, comprising a horizontal conveyor belt that receives the food product and transports the food product into and through a heating housing having a heating element, the heating housing having a discharge end;
   delivering the food product through the heating housing in a generally horizontal path;
   cutting the food product directly after being discharged from the discharge end of the heating housing;
   outputting a finished product that is cut and removed from the food product;
   outputting a remainder of the food product that is an unfinished product; and
   inputting the unfinished product into a second horizontal char slicer, wherein the unfinished food product is conveyed through a heating housing having a heating element.

2. The method of claim 1 wherein the heating element is an infrared burner.

3. The method of claim 1 wherein the cutting device is a band slicer.

4. The method of claim 1 wherein the cutting device slices the food product in a cutting plane that is generally horizontal and generally parallel to the conveyor belt.

5. The method of claim 1 wherein the finished product is transported away from the unfinished product on a finished-product conveyor.

* * * * *